US012798079B2

(12) United States Patent
Asada et al.

(10) Patent No.: US 12,798,079 B2
(45) Date of Patent: Nov. 17, 2026

(54) SYSTEMS AND METHODS FOR ASSISTING MOVEMENT USING ROBOTIC LIMBS

(71) Applicant: Massachusetts Institute of Technology, Cambridge, MA (US)

(72) Inventors: Haruhiko Harry Asada, Lincoln, MA (US); Erik Nicholas Ballesteros, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 18/860,185

(22) PCT Filed: Apr. 27, 2023

(86) PCT No.: PCT/US2023/020226

§ 371 (c)(1),
(2) Date: Oct. 25, 2024

(87) PCT Pub. No.: WO2023/212212

PCT Pub. Date: Nov. 2, 2023

(65) Prior Publication Data

US 2025/0345926 A1 Nov. 13, 2025

Related U.S. Application Data

(60) Provisional application No. 63/336,903, filed on Apr. 29, 2022.

(51) Int. Cl.

| | |
|---|---|
| ***B25J 9/00*** | (2006.01) |
| ***B25J 13/08*** | (2006.01) |
| ***B64G 4/00*** | (2006.01) |

(52) U.S. Cl.

CPC ........... *B25J 9/0006* (2013.01); *B25J 13/085* (2013.01); *B64G 4/00* (2013.01); *B64G 2004/005* (2013.01)

(58) Field of Classification Search

CPC ...... B25J 13/085; B25J 9/0006; B25J 9/0087; B64G 2004/005; B64G 6/00; B64G 4/00

See application file for complete search history.

(56) References Cited

U.S. PATENT DOCUMENTS

| | | | | |
|---|---|---|---|---|
| 9,381,642 | B2 | 7/2016 | Asada et al. | |
| 9,554,964 | B1 * | 1/2017 | Johnson .................. | A61H 3/04 |
| 11,059,532 | B1 | 7/2021 | Fay et al. | |
| 11,738,445 | B2 * | 8/2023 | Mhd ..................... | B25J 9/1689 700/264 |

(Continued)

FOREIGN PATENT DOCUMENTS

| | | | |
|---|---|---|---|
| WO | WO 2017/156363 | A1 | 9/2017 |
| WO | WO 2019/040430 | A1 | 2/2019 |
| WO | WO 2020/172097 | A1 | 8/2020 |
| WO | WO 2020/263641 | A1 | 12/2020 |

OTHER PUBLICATIONS

International Search Report and Written Opinion for International Application No. PCT/US2023/020226 dated Jul. 18, 2023.

(Continued)

*Primary Examiner* — Wade Miles
*Assistant Examiner* — Zachary Joseph Wallace
(74) *Attorney, Agent, or Firm* — Wolf, Greenfield & Sacks, P.C.

(57) ABSTRACT

Systems and methods for assisting movement of a user and/or a base connected to one or more robotic limbs are described herein. Forces may be applied to one or more robotic limbs to control movement of the base. The base may be attached to a user, or other payload, and forces applied to the base due to externally applied forces, such as those applied by a user interacting with an environment, may result in reactionary forces being applied to the one or more robotic limbs. These forces may be detected and used to determine one or more commands for operation of the one or more robotic limbs. Optionally, the robotic limbs may include one or more end effectors which may removably couple or otherwise be held substantially stationary relative to an environment to form a closed loop kinematic chain.

20 Claims, 6 Drawing Sheets

(56) References Cited

U.S. PATENT DOCUMENTS

| | | | | |
|---|---|---|---|---|
| 2008/0109115 | A1 | 5/2008 | Lim | |
| 2017/0259427 | A1 | 9/2017 | Asada et al. | |
| 2018/0370021 | A1 | 12/2018 | Asada et al. | |
| 2022/0176546 | A1 * | 6/2022 | Smith | B25J 13/085 |
| 2023/0339096 | A1 * | 10/2023 | Alam | B25J 15/0616 |

OTHER PUBLICATIONS

International Preliminary Report on Patentability (Chapter 1) for International Application No. PCT/US2023/020226 dated Nov. 7, 2024.

Eden et al., Principles of human movement augmentation and the challenges in making it a reality. Nat Commun. Mar. 15, 2022;13(1):1345. doi: 10.1038/s41467-022-28725-7.

Gourmelen et al., Co-Limbs: An Intuitive Collaborative Control for Wearable Robotic Arms. SA '19: SIGGRAPH Asia 2019 Emerging Technologies. Nov. 2019:9-10. doi: 10.1145/3355049.3360526.

Keemink et al., Admittance control for physical human-robot interaction. Int J Robot Res. Apr. 2018;37(11):1421-44.

Kim et al., MOCA-MAN: A MObile and reconfigurable Collaborative Robot Assistant for conjoined huMAN-robot actions. 2020 IEEE International Conference on Robotics and Automation (ICRA). Aug. 2020:10191-7. doi: 10.1109/ICRA40945.2020.9197115.

Kurek et al., The MantisBot: Design and impedance control of supernumerary robotic limbs for near-ground work. 2017 IEEE International Conference on Robotics and Automation (ICRA). Jun. 2017:5942-7. doi: 10.1109/ICRA.2017.7989700.

Ott et al., Admittance Control using a Base Force/Torque Sensor. IFAC Proceedings Volumes. 2009;42(16):467-72.

Parietti et al., Bracing the human body with supernumerary Robotic Limbs for physical assistance and load reduction. 2014 IEEE International Conference on Robotics and Automation (ICRA). Jun. 2014:141-8. doi: 10.1109/ICRA.2014.6906601.

Tong et al., Review of Research and Development of Supernumerary Robotic Limbs. IEEE/CAA Journal of Automatica Sinica. May 2021;8(5):929-52.

* cited by examiner

SYSTEMS AND METHODS FOR ASSISTING MOVEMENT USING ROBOTIC LIMBS

RELATED APPLICATIONS

This application is a national stage filing under 35 U.S.C. § 371 of international PCT application PCT/US2023/020226, filed Apr. 27, 2023, which is a non-provisional application filing which claims the benefit of U.S. Provisional Application Ser. No. 63/336,903, filed Apr. 29, 2022, the disclosure of each of which is incorporated herein by reference in its entirety.

FIELD

Disclosed embodiments are related to systems and methods for assisting movement of a user using robotic limbs.

BACKGROUND

Users may interact with an environment to complete one or more desired tasks. This may include situations in which a user may move within the environment to complete the tasks. In certain situations, such as extravehicular activities (EVA), where a user may be in a space suit or otherwise their movement may otherwise be constrained or difficult, moving within the environment and/or completing the task may require the user to exert an effort. This may correspondingly result in user fatigue.

SUMMARY

In some embodiments, a system for assisting movement of a user comprises a base, at least two robotic limbs attached to the base, and one or more sensors configured to detect forces applied to the robotic limbs. The system for assisting movement of a user further comprises at least one processor configured to obtain the forces detected by the one or more sensors, determine a direction of the forces relative to the base, determine a command based at least in part on the direction of the forces, and operate the at least two robotic limbs based at least in part on the command.

In some embodiments, a method for assisting movement of a user comprises detecting forces applied to at least one robotic limb, determining a direction of the detected forces relative to a base attached to the at least one robotic limb, determining a command based at least in part on the direction of the forces, and operating the robotic limb based at least in part on the command.

In some embodiments, a non-transitory computer readable media including processor executable instructions that when executed by one or more processors perform the method of the above paragraph.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
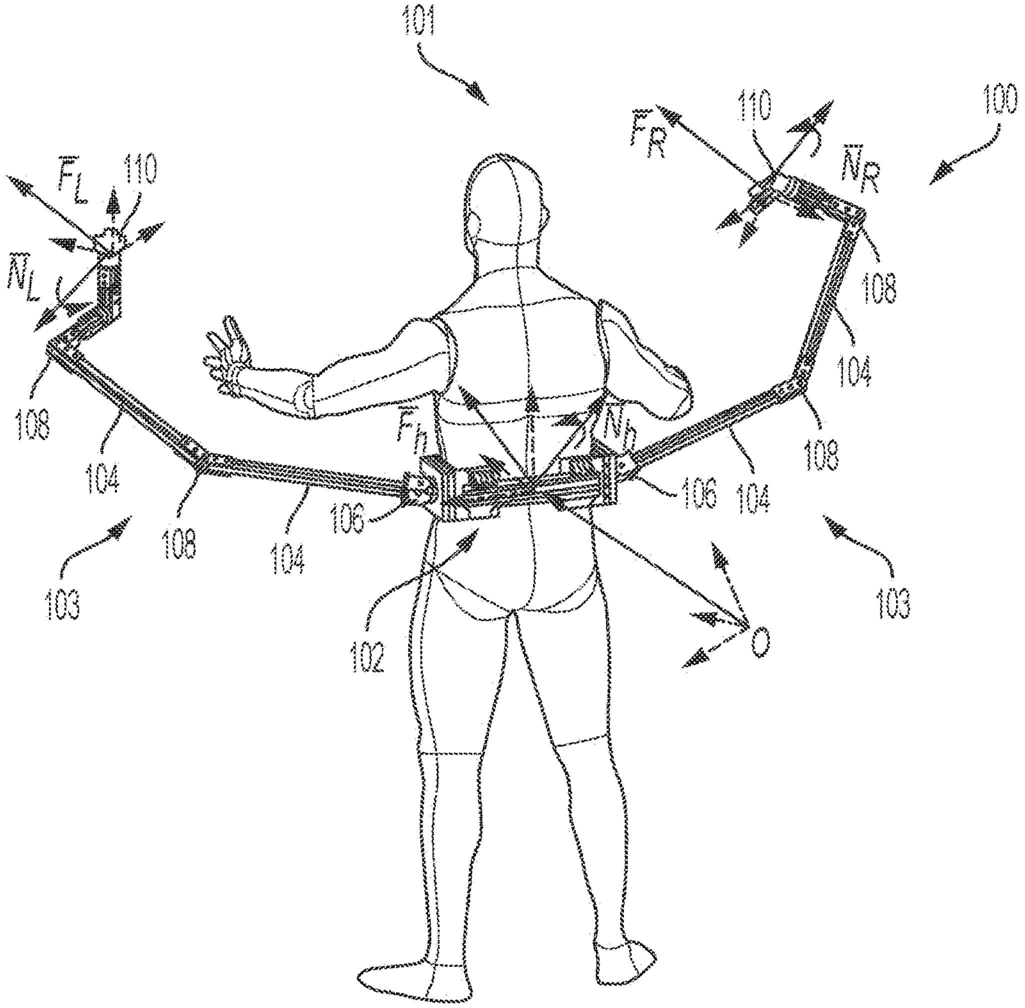
FIG. 1 shows a back perspective view of a robotic system including robotic limbs according to some embodiments.

In various situations, a user may perform a task using their hands and may be required to perform the task in a specific location, requiring the user to move a distance to reach the specific location and possibly maintain a pose in order to complete the task. This may require the user to exert effort while moving to the specific location, maintaining the pose, and/or completing the task. Accordingly, there is opportunity for the user to become fatigued as a result of exerting effort, which may be detrimental to the results and/or quality of the task being completed. Alternatively or additionally, maintaining the pose of the user may either be difficult and/or exhibit a potential safety risk to the user. One such situation includes an astronaut performing an Extra-Vehicular Activity (EVA) such as maintenance task on an exterior of a space station. EVAs such as the maintenance task performed on the exterior of the space station are especially complex and costly missions associated with spaceflight missions. EVAs are also inherently risky, as an astronaut may be in an environment without additional oxygen for extended periods of time, thereby requiring the astronaut to rely on a finite quantity of oxygen supplied by a space suit. As the astronaut exerts effort, they may need to breathe heavily, which generates carbon dioxide and depletes the finite oxygen supply and poses a risk of asphyxiation if sufficiently large amounts of carbon dioxide are generated. Accordingly, it is desirable to reduce the effort of a user such as an astronaut while moving and/or maintaining a pose while completing a task in various environments including during EVA.

One existing approach to assisting an astronaut perform an EVA includes a machine that may hold the feet of the astronaut and articulate about a spacecraft to move the astronaut to a certain location. However, this approach requires a complicated and burdensome control process as well as the use of machines that are costly and physically large, taking up excessive amounts of valuable space. Another existing approach to EVAs includes tethering the astronaut to the spacecraft, which is also complicated as well as time and effort intensive for the astronaut to repeated tether and untether themselves from various locations as they perform an EVA.

In view of the above, the Inventors have recognized the benefits associated with employing a supernumerary robotic limb to assist the user in moving and/or maintaining a pose to reduce the effort and associated fatigue for a user. However, in instances where the user is attached to the supernumerary robotic limb, moving may be difficult and/or the user may actually exert additional effort to move the supernumerary robotic limb, thereby increasing the opportunity for fatigue. Further, controlling the supernumerary robotic limb may be complicated and/or unintuitive for the user, thereby increasing training time and/or increasing the likelihood of errors while controlling the supernumerary robotic limb. Accordingly, the Inventors have recognized a need for a supernumerary robotic limb system that assists movement of a user in a simple and intuitive manner.

In view of the above, the Inventors have recognized the benefits associated with controlling operation of one or more supernumerary robotic limbs configured to be attached to a user based at least in part on reaction forces applied to the one or more supernumerary robotic limbs during interaction of the user with the surrounding environment. For example, a system for assisting movement of a user may include one or more robotic limbs with end effectors that may have forces applied to the end effectors by a user and/or by the environment during use. The applied forces may be result in reaction forces being applied to the end effectors associated with the distal portions of the one or more robotic limbs interacting with the environment. As elaborated on further below, the use of the reaction forces may help to facilitate control of the one or more robotic limbs based on intuitive and natural interactions of the user with the environment.

As detailed further below, in some embodiments, a system including two or more robotic limbs may advantageously form a closed loop kinematic chain which may facilitate the measurement and use of the above noted reaction forces for controlling operation of a system. As discussed further elsewhere, the closed loop kinematic chain may be formed by coupling the end effectors to an environment. The applied forces may be detected using any appropriate combination of one or more sensors. Directions associated with the applied forces may be estimated using the detected forces. The robotic limbs may be coupled to a base, and the detected forces on the robotic limbs may be combined to determine forces and corresponding directions of the forces applied to the base. A command may be determined based at least in part on the identified direction of the forces applied to the base. For example, a user may apply forces to the robotic limbs and forces with corresponding directions applied to the base may be determined to create velocity commands to operate the robotic limbs. In some embodiments, a velocity command may including both a direction and magnitude of a commanded velocity for movement of the base and/or user. Such operation offers a simple control approach where in some embodiments a user may move themselves in a direction they wish to move, and the system will allow safe and low-effort movement in the desired direction. Optionally, velocity commands can be determined at least in part based on magnitudes of forces applied to the robotic limbs and/or end effectors. For example, a direction of the velocity command may be at least partially oriented in, and in some instances parallel to, a direction of a net force applied to the base by the robotic limbs. Velocity commands may comprise a displacement in a desired direction over time, i.e., a direction and magnitude. This velocity command may be appropriately transformed into one or more commands for the robotic limbs, including one or more commands for the individual joints of the robotic limbs, to provide the desired combined motion of the robotic limbs and associated base as elaborated on further below.

Forces applied to the robotic limbs, end effectors, base, and any other appropriate element of the system as described herein may be detected using any appropriate sensor or combination of sensors configured to sense applied forces as the disclosure is not so limited. The sensors as described herein may include load cells, strain sensors, force sensors, linear variable differential transformers (LVDT), displacement sensors, joint torque sensors, combinations of the forgoing, and/or any sensor configured to directly or indirectly detect force using an associated displacement or strain. The one or more sensors may include sensors configured to detect forces in a single axis, multiple axes, multiple sensors configured to measure a force in a single axis and directed in different orientations, combinations of the above, and/or any other appropriate type of sensor. Further, the sensors may be coupled to any appropriate portion of the system including the robotic limbs, links of the robotic limbs, joints of the robotic limbs, the base, joints of the base, end effectors, and/or any other appropriate portion of a system where the desired forces may be measures as the disclosure is not limited in this fashion.

The quantity and orientation of sensors used to detect force as described herein may be determined at least in part based on the degrees of freedom (DOF) of the system. For example, a system with robotic limbs having three or more degrees of freedom (e.g., controlled movement in three dimensions) may benefit from three or more force sensors each configured to detect force in three or more axes. In some embodiments, the one or more force sensors may detect force in three axes. In further embodiments, the one or more force sensors may be configured to detect force in six axes, that is, the system may detect forces using six DOF. Thus, it should be understood that any sensor with any appropriate number of axes of detection for a desired application may be used with the disclosed systems and methods. Thus, in some embodiments, the combination of force sensors may be configured to detect forces in at least three axes (e.g., translation axes) and preferably in six axes. In some embodiments, detecting force in six axes may enable fine tuning of the force detection, which may improve the quality of operation of the system.

In embodiments where forces applied to the system are detected in a reference frame associated with a portion of a robotic limb, e.g., a link of a robotic limb, limb joint of a robotic limb, and/or end effector of the robotic limb, it may be desirable to translate these forces to a reference frame associated with the base and/or user. Transforming the various reference frames of the robotic limbs to a reference frame associated with the base and/or user may allow the forces to be combined to better inform how the forces, when combined, are directed relative to the user and/or base. This net force applied to the base and/or use in a reference frame of the base may be used to determine appropriate commands, such as velocity commands, for controlling operation of the robotic limbs. Further, translating/transforming the reference frames may be desirable due to the robotic limbs having a plurality of potential configurations. That is, a reference frame associated with a link of a robotic limb, for example, may be oriented differently according to the configuration of the robotic limb which may make it difficult to combine the sensed forces associated with the separate robotic limbs and determining their orientation relative to a base of the system. Thus, in some embodiments, the sensed reaction forces may be transformed from a reference frame of the robotic limbs to a reference frame of the base and/or use using one or more transformation matrices, such as a Jacobian matrix transformation, or other appropriate method. Transforming the reaction forces from the reference frame of the robotic limbs to a reference frame of the base and/or user in some cases may involve translation and/or rotation depending on the application and orientation of the robotic limbs.

Information regarding configurations/poses of the robotic limbs includes information associated with the joints of the robotic limbs. For example, a limb joint may be rotatable and accordingly a pose associated with the limb joint may include an angle formed between a first link and a second link via the limb joint. Base joints coupling a link of the robotic limb to the base may also be rotatable and have associated angles. One or more limb joints and/or base joints may be revolute joints, prismatic joints, combinations of the forgoing, and/or any other appropriate type of joint. Accordingly, information associated with the joints may also include distances associated with extension and/or retraction of a prismatic joint. Angles of the limb joints and base joints may be detected in any appropriate fashion using any appropriate sensor or combination of sensors as the disclosure is not so limited. Sensors configured to measure angles may include encoders, angle sensors, any other appropriate sensor, and any combination thereof. Sensors configured to measure an extension of a prismatic joint may include encoders, linear variable differential transducers (LVDT's), extensometers, and/or any other appropriate type of sensor. When this information is combined with known or measured lengths of links of the robotic limbs, this may allow for information regarding poses/configurations of the robotic limbs to be easily obtained including a position and orientation of an end effector present on a distal end portion of a robotic limb.

As used herein, a link refers to a structural segment of a robotic limb that connects a joint and/or end effector to a different joint of the robotic limb. A pose comprises a position (e.g., location in three-dimensional space) and orientation (e.g., angular orientation in three-dimensional space) of one or more portions of a robotic limb. For example, a pose may describe a location and angular orientation in three-dimensional space of a link, a plurality of links, an end effector, each element of a robotic limb, the base, and any appropriate combination thereof. The pose of each segment of a robotic limb may influence the position and orientation of a distally located segment and/or end effector. As such, the pose of a robotic limb may be viewed as a combination of the pose of each segment and end effector of the robotic limb.

As used herein, a base refers to a portion of the system which each robotic limb of the system connects to either directly or indirectly. The base may couple to the one or more robotic limbs via base joints. The base may be removably coupled to a user by a harness, suit, or other wearable structure such that forces applied by the user to an environment may be at least partially transferred to the robotic limbs. Due to the closed loop kinematic chain formed by the robotic limbs and environment in some embodiments detailed further below this interaction of the user with the environment may result in the above noted reaction forces which are used to control operation of the robotic limbs.

The systems and methods as described herein may be implemented in any appropriate situation and for any appropriate task. As previously described, astronauts performing EVAs or any other appropriate task may benefit from the systems and methods described herein. Thus, the disclosed methods and systems may be used in conjunction with or integrated with a space suit. However, the disclosed methods and systems may be used for any application where a system including supernumerary robotic limbs are used to aid in movement of a user within an environment. This may include applications such as supporting and manipulating a user's pose within an environment while their hands are occupied, helping a user support a load, and/or any other appropriate application. Further, the disclosed methods and systems may be beneficial in any situation where the robotic limbs may be fixed to an object or the environment to form a closed kinematic chain which may help facilitate implementation of the disclosed control methods. In view of the above, it should be understood that any system having one or more supernumerary robotic limbs coupled to a user during operation and where the user is interacting with an environment and/or object the limbs are in contact with may benefit from the systems and methods described herein. It should also be understood that the systems and methods described herein need not necessarily include a human user, and instead, a base associated with the one or more robotic limbs may be used to support a different payload instead of a user as the disclosure is not limited in this fashion.

For the sake of clarity the embodiments described herein primarily refer to sensing, manipulating, or otherwise using a force. However, it should be understood that a force as used herein a may refer to a force matrix including separate components of forces and/or toques applied in different directions within a given reference frame. Thus, it should be understood that any reference to a force or torque herein should be understood to also refer to the use of a force matrix where appropriate which may include values for forces and/or torques oriented in a plurality of different directions.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

A system 100 for assisting movement of a user 101 according to some embodiments is shown in FIG. 1. The system for assisting movement may include one or more robotic limbs 103, such as the depicted embodiment of FIG. 1 having two robotic limbs 103. The robotic limbs 103 may be coupled to a base 102 via base joints 106. The robotic limbs 103 may include one or more links 104 coupled to one another via limb joints 108. A proximal link of the one or more links may also be connected to the associated base joints via a limb joint as well. In some embodiments, the robotic limbs 103 may include end effectors 110 located on a distal portion of the robotic limb 103. The end effectors may be configured to interact with and apply forces to the surrounding environment. This may include end effectors such as graspers, high friction contact pads, and/or any other appropriate type of end effector designed to interact with a desired environment to facilitate a task to be performed by a user. The base 102 may optionally be coupled to the user 101 (e.g., a human) via a harness, suit, or other wearable structure. In the depicted embodiment of FIG. 1, the base is coupled to a hip area of the user using a belt, although the base may couple to any appropriate portion of the user as the disclosure is not so limited. For example, the base 102 may couple to the shoulders, legs, arms, chest, combinations of the above, and/or any other appropriate portion of the user.

As shown in FIG. 1, each of the two end effectors 110 includes an end effector reference frame, each depicted as three arrows each pointing in a direction of a separate axis. The base 102 also includes a base reference frame located central to the base 102, wherein the origin of the base reference frame is labeled as "O" which is different from the reference frame of the two depicted robotic limbs. As previously described, the system for assisting movement 100 may include any appropriate combination of one or more sensors configured to measure force, torque, displacement, and any other appropriate parameter associated with the pose of the system, displacements applied to the system, and/or forces applied to the system. Also previously described, the one or more sensors may be coupled to and/or located on any appropriate portion of the system 100 for assisting movement of the user 101, including any appropriate portion of the robotic limbs 103 and/or base 102 which includes but is not limited to the links 104, base joints 106, limb joints 108, and/or end effectors 110.

In some embodiments, the one or more sensors may detect reaction forces applied to the end effectors 110 due to forces and/or movements applied to the environment by the user. As described herein, the forces applied to the end effectors result in a net force being applied to the base 102 by the separate robotic limb 103. The separate forces applied to the end effectors of the robotic limbs are labeled as $\overline{F}_L$ and $\overline{F}_R$ and the net force applied to the base by the limbs is indicated by the net force $\overline{F}_h$ applied to the base. In embodiments where torques applied to the robotic limbs 103 are detected, the torques applied to the separate limbs may also result in a combined torque applied to the base 102. In the depicted embodiment of FIG. 1, the separate torques for the robotic limbs are indicated by the arrows labeled as $\overline{N}_L$ and $\overline{N}_R$ and the combined torque applied to the base is indicated by the combined torque $\overline{N}_h$. Thus, it should be understood that the measured forces and torques associated with the separate end effectors of the robotic limbs may be summed to provide the desired forces and/or torques in a reference frame of the base in some embodiments.

The system for assisting movement 100 may include any appropriate combination of one or more actuators including motors, stepper motors, solenoids, and any other appropriate mechanical, electrical, or electromechanical actuators to move the user 101, base 102, robotic limbs 103, links 104, end effectors 110, and any other appropriate portion of the system in a desired manner. The actuators may be disposed in any appropriate portion of the system for assisting movement including the base 102, base joints 106, robotic limbs 103, limb joints 108, and/or end effectors 110. For example, one or more base joints 106 and/or limb joints 108 may include actuators configured to move the associated links 104, base 102, and/or end effectors 110 relative to one another. In instances where the end effectors are held stationary due to friction, attachment to a portion of the environment, or other consideration during a commanded operation, movement of links 104 and/or end effectors 110 relative to the base may cause a corresponding force to be applied to the user in a desired direction of motion based on the commanded operation of the links. For example, the actuators may receive velocity commands to provide a commanded velocity of the base and user in a reference frame of the base and/or user using the control methods as described herein. For example, the one or more actuators of a robotic limb may receive a velocity command based on sensed reactionary forces applied to the robotic limbs 103 which may then aid movement of the base 102 and/or user 101 within the environment by applying a corresponding force to the user in a desired direction of motion.

Figure 2:
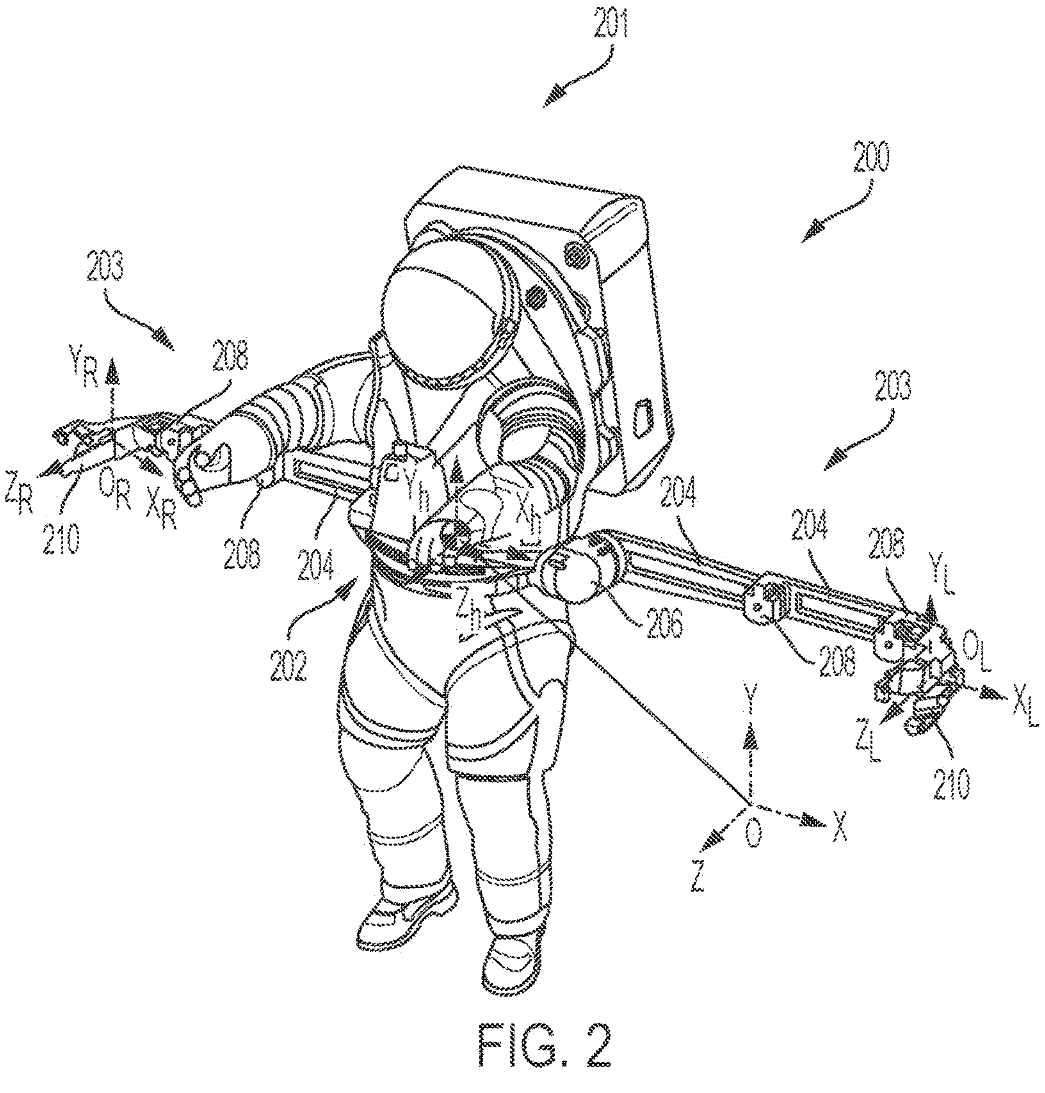
FIG. 2 shows a front perspective view of a robotic system including robotic limbs according to some embodiments.

A system 200 for assisting movement of a user 201 according to some further embodiments is shown in FIG. 2. The system 200 for assisting movement may include one or more robotic limbs 203, such as the depicted embodiment of FIG. 2 having two robotic limbs 203. The robotic limbs 203 may be coupled to a base 202 via base joints 206. The robotic limbs 203 may include one or more links 204 coupled via limb joints 208. In some embodiments, the robotic limbs 203 may include end effectors 210 located on a distal portion of the corresponding robotic limb 203. The base 202 may optionally be coupled to the user 201 (e.g., an astronaut) using any harness, suit, or other wearable component capable of transferring forces to the user's body during operation. In the depicted embodiment of FIG. 2, the base is coupled to a hip area of a space suit of the user, although the base may couple to any appropriate portion of the user as the disclosure is not so limited. For example, the base 202 may couple to shoulders, legs, arms, chest, combinations of the forgoing, and/or any other appropriate portion of the user or optionally the space suit.

As shown in FIG. 2, each of the two end effectors 210 includes an end effector reference frame having origins labeled as $O_R$ and $O_L$, each of which is depicted as three arrows labeled as $X_R$, $Y_R$, and $Z_R$ and $X_L$, $Y_L$, and $Z_L$ respectively with each pointing in a direction of a separate axis. The base 202 also includes a base reference frame having an origin O depicted by three arrows labeled as $X_h$, $Y_h$, and $Z_h$ located central to the base 202. In the depicted embodiment of FIG. 2, the base reference frame is located approximately central to the body of the user 201. In some embodiments, system 200 for assisting movement may be configured such that the base, and the corresponding base reference frame, may be located approximately at the center of mass of the user 201 when worn. This location may or may not account for mass associated with the space suit, or other type of worn system, depending on the desired application. As previously described, the system for assisting movement may include any appropriate combination of one or more sensors configured to measure force, torque, displacement, and/or any other appropriate parameter associated with the system 200 for assisting movement. Also previously described, the one or more sensors may be coupled to and/or located on any appropriate portion of the system for assisting movement, including any appropriate portion of the robotic limbs 203 and/or base 202 which includes but is not limited to the links 204, base joints 206, limb joints 208, and/or end effectors 210.

The system 200 for assisting movement may include any appropriate combination of one or more actuators including, for example, motors, stepper motors, solenoids, and/or any other appropriate mechanical, electrical, or electromechanical actuator configured to actuate the robotic limbs relative to the associated base for assisting movement. The actuators may be disposed in any appropriate portion of the system 200 for assisting movement, including the base 202, base joints 206, robotic limbs 203, limb joints 208, and/or end effectors 210. For example, one or more base joints 206 and/or limb joints 208 may include an actuator configured to move the associated links 204, base 202, and/or end effectors 210. Movement of the base 202, links 204, and/or end effectors 210 may apply a force to the base and user in a desired direction of motion based on the sensed reactionary forces applied to the end effectors as elaborated on further below. The movement elements may receive velocity commands using the control methods as described herein. For example, a motor may receive a velocity command based on force inputs from the robotic limbs 203 and cause the base 202 and/or user 201 to move.

Figure 3:
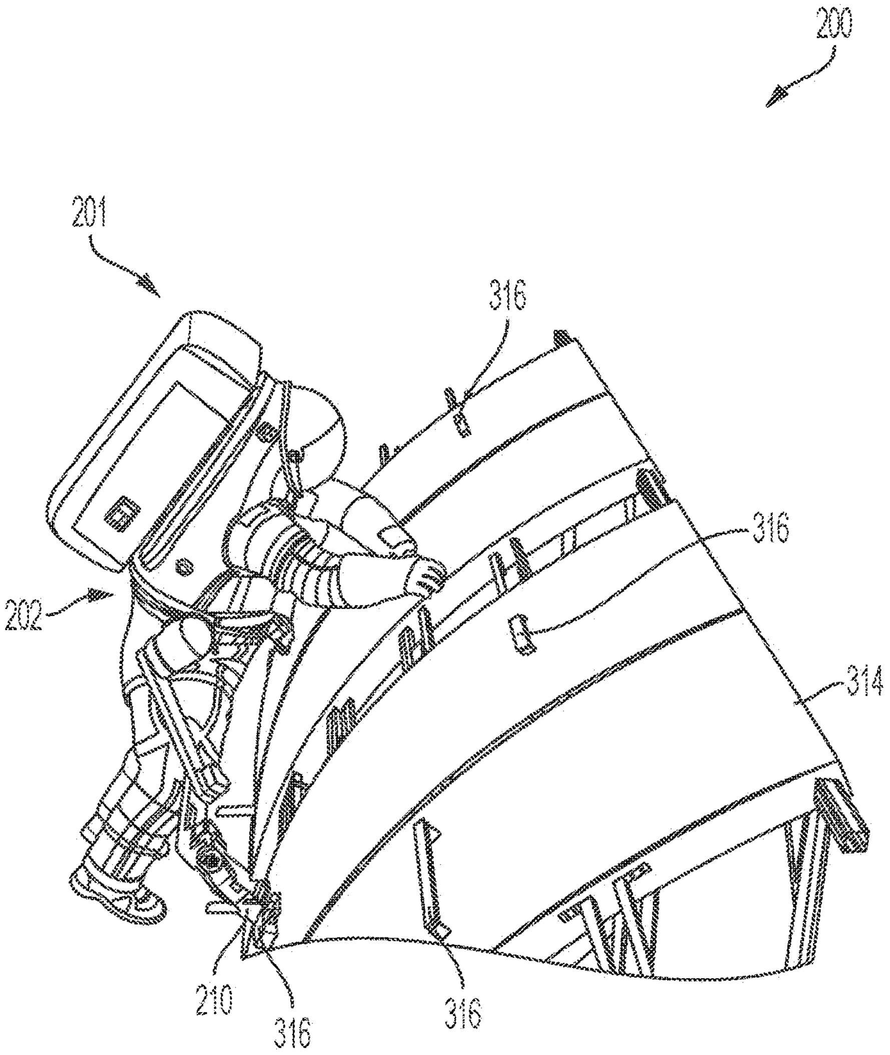
FIG. 3 shows a user using the robotic system within an environment according to some embodiments.

In some embodiments, the system 200 for assisting movement may form a closed loop kinematic chain by coupling with, grasping onto, being held stationary from friction, or otherwise being held stationary relative to features 316 of a surrounding environment 314 the end effectors are in contact with, see FIG. 3. For example, the end effectors 210 may be removably coupled with one or more environment features 316 in any appropriate fashion, as described further elsewhere. In some embodiments, the environment 314 may be an exterior of a spacecraft including but not limited to a satellite, space station, shuttle, or any other appropriate spacecraft. The environment features 316 may be handles (e.g., handrails) or any other features configured to be gripped on a space craft or any other appropriate environment 314 according to some embodiments. In the depicted embodiment of FIG. 3, the user 201 is applying force to the system for assisting movement 200 by gripping an environment features 316 and generating force such that reactive forces acting in a direction the user 201 wishes to move in are applied to the end effectors 210 of the robotic limbs 213.

While the above embodiment is described relative to a user in a space suit operating in proximity to a spacecraft, the currently disclosed systems and methods are not limited to this application. For example, other environments that the systems and methods disclosed herein may be used for may include, but are not limited to, any appropriate extraterrestrial body (e.g., on a planetary scale and/or smaller scales), asteroids, any appropriate environment where it is desirable to reduce an inertia associated with a user, object, or other mass including assembly lines and constructions sites, and any other appropriate environment as the disclosure is not so limited.

The end effectors 210 may couple to the environment 314 and/or environment features 316 in any appropriate fashion. For example, in the depicted embodiment of FIG. 3, the end effectors 210 grip the environment features 316 using a gripper including a plurality of actuatable gripping fingers to grasp the environment feature 316 such that the robotic limb 213 is secured to the environment 314. The end effectors 210 may hold, grip, clamp, magnetically attach to, be held in place with friction, and/or otherwise be held substantially stationary relative to the environment 314 and/or environment features 316 in any appropriate fashion as the disclosure is not so limited. Additionally, in some embodiments, the end effectors 210 may include magnets to facilitate coupling to the environment 314 and/or environment features 316 according to some embodiments. In some embodiments, the end effectors 210 may include one or more features configured to interlock with one or more features of the environment 314 or environment element 316. In some modes of operation, for example when a user desires to maintain a current pose relative to the environment, the end effectors 210 may be locked in place during operation of the system. The robotic limbs and associated end effectors may be movable with any appropriate DOF, including but not limited to 1 DOF, 2 DOF, 3 DOF, 4 DOF, 6 DOF, and any other appropriate DOF as the disclosure is not so limited. In some embodiments, the robotic limbs and associated end effectors may preferably have a DOF that is greater than or equal to 3 DOF or 6 DOF to permit positional control of a user and optional orientation within a three dimensional environment.

Figure 4:
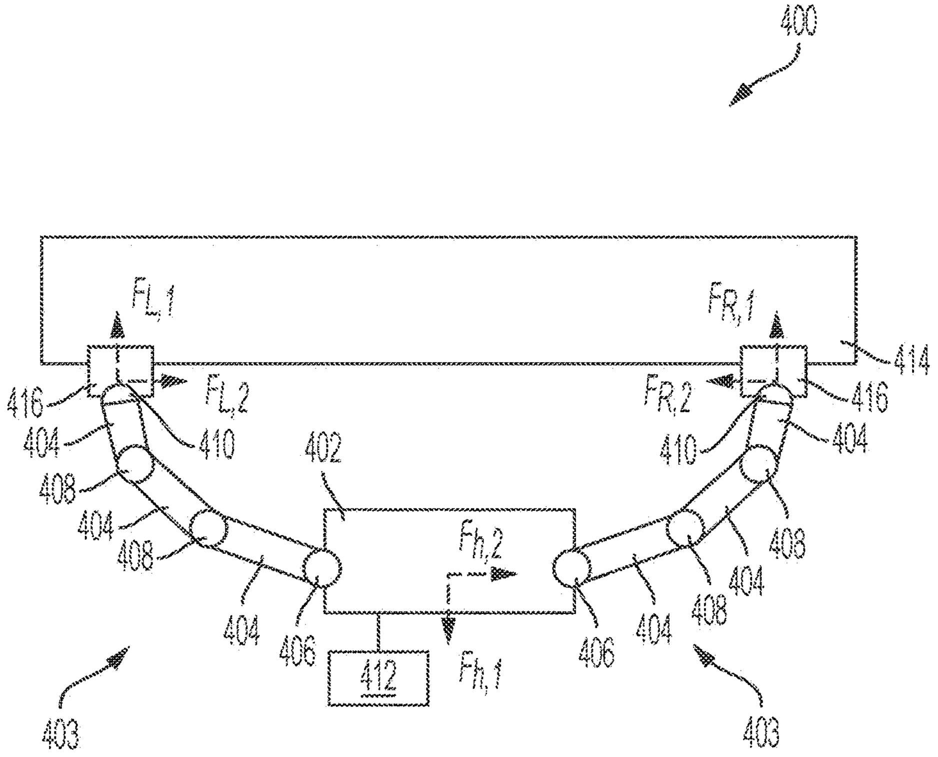
FIG. 4 shows a schematic view of a robotic system within an environment according to some embodiments.

FIG. 4 shows a schematic view of a system 400 for assisting movement according to some embodiments. The system 400 for assisting movement includes a base 402 coupled to one or more robotic limbs 403. The robotic limbs 403 may include any appropriate number of links 404, including but not limited to 1 link, 2 links, 3 links, 4 links, or any other appropriate number of links. Accordingly, the robotic limbs may include any appropriate number of limb joints 408, including but not limited to 0 limb joints, 1 limb joints, 2 limb joints, 3 limb joints, or any other appropriate number of limb joints. In the depicted embodiment of FIG. 4, each robotic limb 403 includes three links 404. The link 404 located most proximate to the base 402 (i.e., a proximal end portion of the robotic limb) is coupled to the base 402 via a base joint 406. The links 404 may be coupled to other links 404 via limb joints 408. The base joints 406 and limb joints 408 may be any appropriate joint as described herein, including but not limited to rotatable and prismatic joints. Each robotic limb 403 includes an end effector 410 coupled to a distal link 404 of the robotic limb (i.e., a distal end portion of the robotic limb). It should be understood that each end effector 410 of the separate robotic limbs may either be the same or different from one another. For example, a first end effector may couple to an environment 414 and/or an environment element 416 using gripping fingers and a second end effector may couple to the environment 414 and/or the environment element 416 using a magnetic connection as the disclosure is not limited to the type of end effector used with the various robotic limbs.

As shown in FIG. 4, forces may be applied to the end effectors 410 due to one or more interactions between a user and the surrounding environment. Forces and torques may be applied to the end effectors 410 in any appropriate direction and with any appropriate magnitude. In the simplified two dimensional diagram depicted in FIG. 4, each of the two end effectors 410 has forces applied in two directions, indicated by $F_{L,1}$ and $F_{L,2}$ on a first end effector and $F_{R,1}$ and $F_{R,2}$ on a second end effector. Based on the assumption that the robotic limbs are substantially stationary relative to the environment, it can be assumed that the summation of the forces applied to each end effector 410 may be combined to determine a combined base force applied to the base in the separate axes of the base $F_{h,1}$ and $F_{h,2}$. However, this process is complicated due to the reference frames of the end effectors and base potentially being unaligned with one another. Therefore, the sensed forces applied to the end effectors may be transformed into a reference frame of the base to determine the net force applied to the base. As elaborated on below, this net force may then be used to determine a command for operating the robotic limbs to apply a force to the user in a desired direction of motion which may again include a conversion of the desired motion of the user into a desired trajectory of the robotic limbs using another transformation. This process may be implemented by the system 400 for assisting movement using one or more controllers 412 which may include one or more processors and associated non-transitory computer readable memory including processor executable instructions that when executed by the one or more processors may perform any of the methods and/or control loops described herein.

Figure 5:
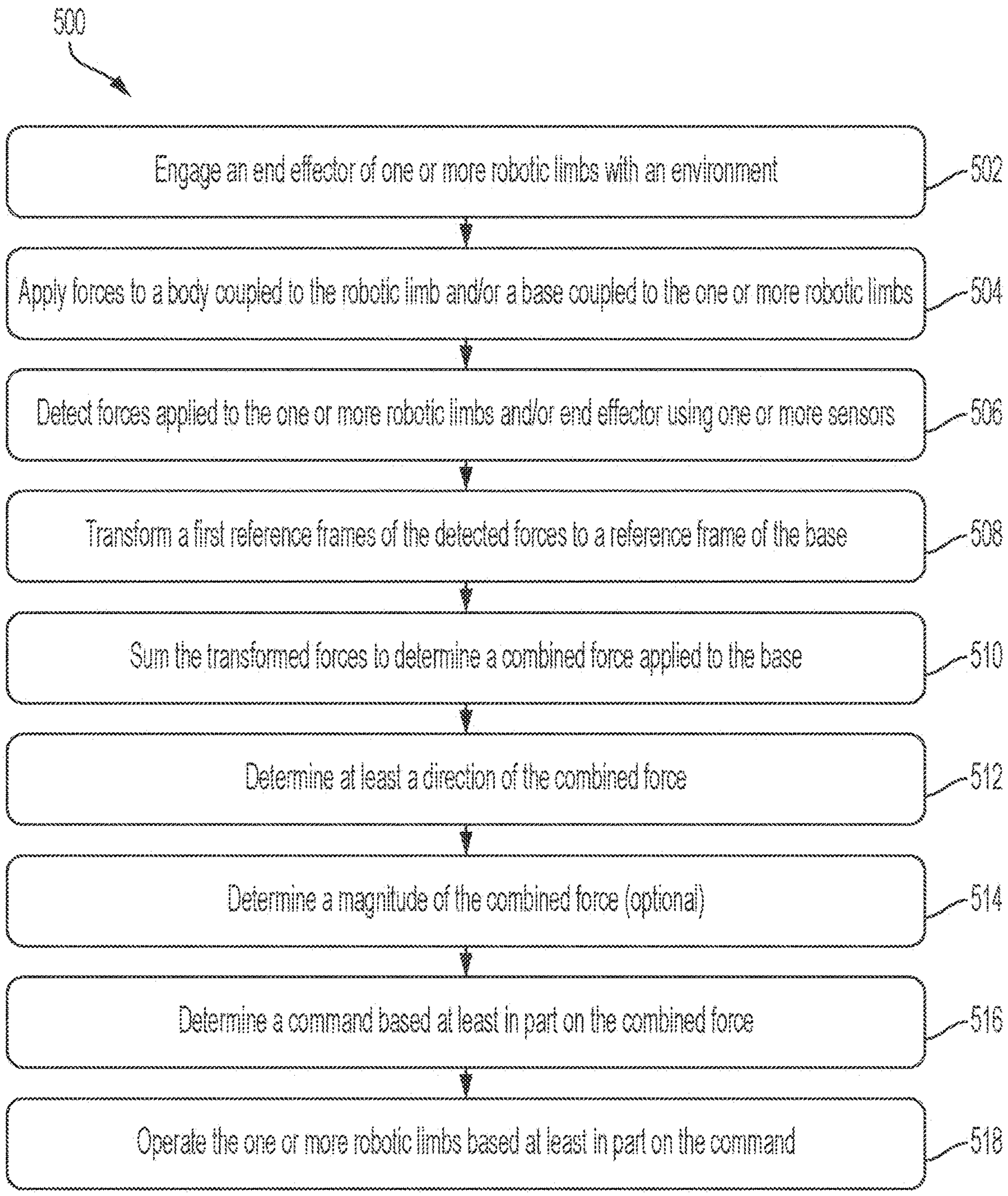
FIG. 5 shows a flow chart for one embodiment of a method of using a robotic system.

Movement of a user may be assisted by following the method 500 presented by the depicted flow chart of FIG. 5 according to some embodiments. An end effector of one or more robotic limbs may engage with and be held substantially stationary relative to an environment, see 502. Forces may be applied to a body coupled to the robotic limbs and/or a base coupled to the robotic limbs as shown at 504. The force applied to the body and/or base may cause corresponding reaction forces between the robotic limbs (e.g., end effectors of the robotic limbs) and the environment. The forces applied to the robotic limbs may be detected using one or more sensors, see 506. Due to the end effectors likely being oriented in directions that are misaligned with a reference frame of the user and/or base of the system, it is difficult to use these sensed forces in their current state. Therefore, in some embodiments, the detected forces may be transformed from the reference frame of the associated robotic limb and/or end effector to a reference frame of the user and/or base at 508. This may be done using any appropriate type of transformation including a Jacobian transformation. Once in the desired reference frame, the transformed forces from the separate robotic limbs may be summed to determine a net force applied to the base and/or use at 510. Depending on the embodiment, at least a direction and optionally a magnitude of the net force applied to the base may be determined, see 512 and 514. A command for a desired movement of the user may be determined based at least in part on the net force at 516. This may include determining a direction and magnitude of the commanded movement for the base and/or user which may correspond to a velocity command. In order to apply this command using the robotic limbs, it may be desirable to apply one or more transformations to change the command from a reference frame of the base and/or user into appropriate joint commands associated with the various joints of the robotic limbs. In either case, the robotic limbs may be operated based at least in part on the determined command, see 516. As a result of applying the command, which again may be a velocity command, to the base and/or the robotic limbs, a power, and thus an effort expended by a user, needed to move in a desired direction may be reduced.

Figure 6:
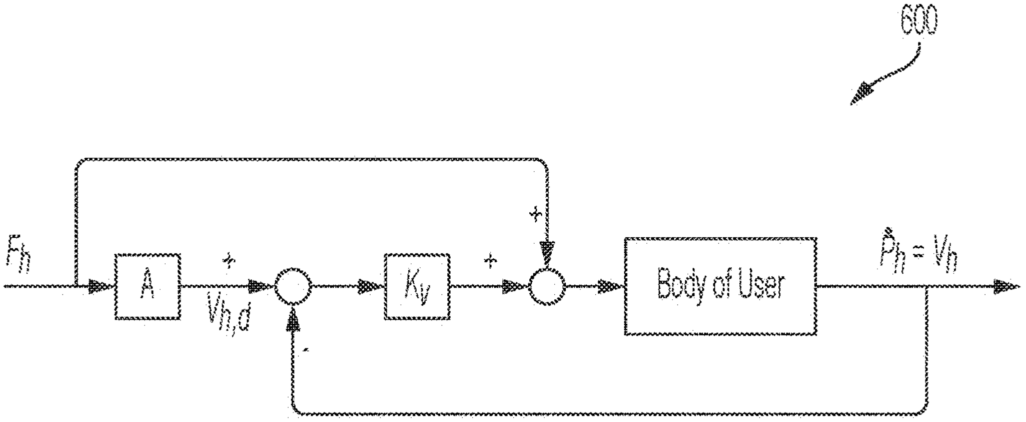
FIG. 6 shows a schematic view of a control loop according to some embodiments.

FIG. 6 shows an embodiment of a control loop 600 that may be implemented with the systems and methods as described herein. In some embodiments, the control loop 600 represents an admittance controller. The control loop 600 includes a force $F_h$ as an input and a commanded velocity $V_h$ (which may be equivalent to $\dot{P}_h$) as an output for a desired movement of a base of a system and associated user connected to the base during operation. As previously described, the force $F_h$ may be the combined sensed reactionary forces applied to the end effectors of the robotic limbs of a system in a reference frame of the base of the system and/or user. In some embodiments, the force $F_h$ may be a diagonal matrix containing force values in at least three directions (e.g., three cardinal directions such as X, Y, and Z) applied to the robotic limbs.

In some instances, the detected values for the input force $F_h$ may be relatively noisy. Thus, in some embodiments, one or more filters may be applied to the sensed input force $F_h$ to more accurately determine the detected forces applied to the base by the associated robotic limbs. In some embodiments, the force $F_h$ may be estimated using a Kalman Filter, and/or any other appropriate method for filtering and/or better estimating the input force.

Input $F_h$ may be fed into an admittance matrix A, where the admittance matrix A may represent the inverse of a damping matrix in some embodiments. The admittance matrix A may be adjusted as desired to tune the resulting output $V_{h,d}$, which in turn tunes the output of the control loop $V_h$. For example, by increasing the values of admittance matrix A, the damping of the system may effectively be reduced, thereby making the system more responsive to inputs (e.g., more agile) while decreasing values of the admittance matrix in one or more directions may make the system less sensitive to forces applied in those directions. Accordingly, the admittance matrix may be used to either provide either the same or different levels of damping, or conversely responsiveness, to forces applied in different directions by a user. For instance, it may be desirable to move a user more slowly in one direction in response to a command (e.g., towards a surface) while permitting more free movement of the user in other directions. For example, it may be desired for a user to move a first distance in a first direction for a given amount of force and move a shorter second distance in a second direction for the same amount of force. In another example, it may be desirable for the user to move with a relatively low amount of applied force in cardinal directions, and to rotate only if relatively high amounts of force and/or torque are applied. In such an embodiment, the cardinal directions of the admittance matrix may have larger values as compared to the values of the admittance matrix associated with torques. Of course, it should be understood that any appropriate combination of values for the admittance matrix may be used depending on the desired functionality of a system as the disclosure is not so limited.

The output of the admittance matrix A may be an intermediate velocity matrix $V_{h,d}$, which may optionally be inputted into a difference junction where the commanded velocity $V_h$ may be used in a feedback loop where the commanded velocity $V_h$ is subtracted from the intermediate velocity matrix $V_{h,d}$. The intermediate velocity matrix $V_{h,d}$ or the output from the difference junction may be input into a gain matrix $K_v$. The gain matrix $K_v$ may be adjusted as desired to achieve a desired output of the control loop, similar to the adjustability of the admittance matrix A as previously described. In some embodiments, the gain matrix $K_v$ effectively adjust the mass of the system within the control loop. Adjusting the mass of the system within the control loop may enable the user to apply more or less force to move a distance and/or with a desired velocity for a given force applied to the system. Adjusting the gain matrix $K_v$ may also alter the moment of inertia of the system within the control loop, allowing for control over the applied force/torque needed to rotate the user. In some embodiments, increasing $K_v$ may effectively reduce the mass of the user making it easier to move a base and/or user attached to the base for a force input to the system by the user.

The control loop 600 may include a feedforward loop, shown in the depicted embodiment of FIG. 6 as $F_h$ being added to a summing junction disposed upstream from the transfer function labeled as "Body of User". The feedforward loop as shown may allow for $F_h$ to affect the output immediately, and when the input $F_h$ is removed, the output $V_h$ may gradually reduce to zero (e.g., attenuate). This gradual reduction in output resulting from the feedforward loop may help to provide a more intuitive control for the user and may also help reduce or prevent jarring stops in movement of the user which may help improve comfort of the user during use.

In some embodiments, the control loop 600 may also be configured to reject disturbances (e.g., disturbance rejection) even though rejecting disturbances is not visually represented in the depicted embodiment of FIG. 6. In some embodiments, disturbances may be forces applied to the system originating from something other than the user. Examples of sources of disturbances may include wind, falling objects, gravity, forces resulting from tools being used by the user, and any other appropriate source of a force being applied to the system as the disclosure is not so limited. Relatively small amounts of applied force originating from the user (e.g., forces unintentionally applied by the user) may also be treated as disturbances according to some embodiments.

In view of the above, in certain embodiments, the control loop 600 may treat any input force $F_h$ below a threshold force as a disturbance and accordingly may reject (e.g., not affect the output $V_h$ based on) the input force $F_h$. In some embodiments, the threshold may be set by adjusting a rejection factor $\eta$. The rejection factor $\eta$ may be a matrix including values corresponding to each DOF of the system for assisting movement, such as a three-by-one or preferably a six-by-one matrix of values set to any appropriate level. For example, each of the rejection factor $\eta$ values may be set equal to or between 0 and 1, where setting $\eta$ as 1 may completely reject the disturbances and setting $\eta$ as 0 may not reject any disturbances. In some embodiments, the threshold for disturbances may also be set to different threshold forces for different directions of movement and/or rotation. For example, an amount of force in a first direction may move the user a distance in the first direction, but the same amount of force in a second direction may be rejected as a disturbance and accordingly the user will not move in the second direction. In some embodiments, the thresholds for disturbance rejections may be set by adjusting one or both of the admittance matrix A and the gain matrix $K_v$. For example, in some embodiments disturbance rejection may be implemented by setting the admittance matrix A to follow the equation: $A=-\eta K_v^{-1}$ where $\eta$ is the rejection factor and $K_v$ is the gain matrix as described herein.

Also noted above, the control loop 600 may also include a feedback loop. In the depicted embodiment of FIG. 6, the output $V_h$ is being subtracted at a difference junction disposed between the admittance matrix A and the gain matrix $K_v$. By subtracting the output $V_h$ from the output of the admittance matrix A, the actual velocity is being compared to the desired velocity. The feedback loop allows the system to compensate for error between the desired velocity and the actual velocity by determining the difference between the desired velocity and the actual velocity and controlling the output accordingly. In some embodiments, the actual velocity is determined by using Jacobian transformations, or other appropriate transformations, of movements of the end effectors into movements defined in a reference frame of the user, base, and/or any other payload attached thereto. In embodiments where the system for assisting user movement includes two or more robotic limbs with associated end effectors, each end effector may have a different Jacobian matrix, or other appropriate transform, to transform the reference frames of the end effectors to a reference frame of the base. For example, the system may have a left robotic limb and a right robotic limb and the left robotic limb may have an associated left Jacobian transformation matrix and the right robotic limb may have a right Jacobian transformation matrix.

In the embodiment of the control loop depicted by FIG. 6, $F_h$ is used in a feed forward loop and $V_h$ is used in a feedback loop. However, embodiments without a feedforward loop and/or without a feedback loop are also contemplated as the disclosure is not so limited. Further, other configurations of both the feedforward loop and the feedback loop are contemplated and the disclosure is not limited to the control loop shown in FIG. 6.

The various methods disclosed above may be implemented by one or more controllers including at least one processor operatively coupled to the various controllable portions of a system for assisting movement as disclosed herein. Alternatively or additionally, in some embodiments, the disclosed methods may be performed at least in part, and in some instances completely, on a computing device that is separate and removed from the disclosed systems for assisting movement. In either case, the disclosed methods may be embodied as computer readable instructions stored on non-transitory computer readable memory associated with the at least one processor such that when executed by the at least one processor the associated system, which may be a system for assisting movement in some embodiments, may perform any of the actions related to the methods disclosed herein. Additionally, it should be understood that the disclosed order of the steps is exemplary and that the disclosed steps may be performed in a different order, simultaneously, and/or may include one or more additional intermediate steps not shown as the disclosure is not so limited.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

The controller 412 may operate in a networked environment using logical connections to one or more remote computers, such as a remote computer. The remote computer may be a personal computer, a server, a router, a network PC, a peer device or other common network node, and typically includes many or all of the elements described above relative to the controller 412.

The various methods or processes outlined herein may be implemented in any suitable hardware. Additionally, the various methods or processes outlined herein may be implemented in a combination of hardware and of software executable on one or more processors that employ any one of a variety of operating systems or platforms. Examples of such approaches are described above. However, any suitable combination of hardware and software may be employed to realize any of the embodiments discussed herein.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present disclosure. The non-transitory computer-readable medium or media may be transportable, such that the program or programs stored thereon may be loaded onto any computer resource to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion among different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A system for assisting movement of a user comprising:
- a base;
- at least two robotic limbs attached to the base;
- one or more sensors configured to detect forces applied to the at least two robotic limbs;
- at least one processor configured to:
  - obtain the forces detected by the one or more sensors;
  - determine a direction of the forces relative to the base;
  - determine a command based at least in part on the direction of the forces; and
  - operate the at least two robotic limbs based at least in part on the command; and
- one or more end effectors coupled to the at least two robotic limbs, wherein the one or more end effectors are configured to removably couple with an environment, and wherein the at least two robotic limbs are configured to form a closed kinematic chain with the base and the environment.

2. The system of claim 1, wherein determining the direction of the forces relative to the base comprises transforming the forces from reference frames associated with the at least two robotic limbs to a reference frame associated with the base.

3. The system of claim 2, wherein the at least one processor is further configured to sum the transformed forces from the at least two robotic limbs to obtain a net force applied to the base to determine the command.

4. The system of claim 3, wherein the at least one processor is further configured to determine a magnitude of the net force to determine the command.

5. The system of claim 1, wherein the command is a velocity command of the base including a commanded direction and magnitude.

6. The system of claim 5, wherein the at least one processor is further configured to determine one or more limb commands for the at least two robotic limbs based at least in part on the velocity command.

7. The system of claim 5, wherein the commanded direction of the velocity command is at least partially oriented in a direction of a net force applied to the base by the forces.

8. The system of claim 5, wherein the one or more sensors are configured to detect a velocity of the base, and wherein the at least one processor is further configured to compare the velocity command to the detected velocity and alter the velocity command based on the detected velocity.

9. The system of claim 8, wherein altering the velocity command based on the detected velocity results in a decay in the velocity command over time.

10. The system of claim 1, wherein the base is coupled to a space suit.

11. A method for assisting movement of a user comprising:
- removably coupling at least two robotic limbs with an environment to form a closed kinematic chain with the at least two robotic limbs, a base attached to the at least two robotic limbs, and the environment;
- detecting forces applied to the at least two robotic limbs;
- determining a direction of the forces relative to the base;
- determining a command based at least in part on the direction of the forces; and
- operating the at least two robotic limbs based at least in part on the command.

12. The method of claim 11, wherein determining the direction of the forces comprises transforming the forces from a reference frame of the at least two robotic limbs to a reference frame of the base.

13. The method of claim 12, further comprising summing the transformed forces to obtain a net force applied to the base to determine the command.

14. The method of claim 13, further comprising determining a magnitude of the net force to determine the command.

15. The method of claim 11, wherein the command is a velocity command of the base including a commanded direction and magnitude.

16. The method of claim 15, further comprising determining one or more limb commands for the at least two robotic limbs based at least in part on the velocity command.

17. The method of claim 15, wherein the commanded direction of the velocity command is at least partially oriented in a direction of a net force applied to the base by the forces.

18. The method of claim 15, further comprising detecting a velocity of the base, and further comprising comparing the velocity command to the detected velocity and altering the velocity command based on the detected velocity.

19. The method of claim 18, wherein altering the velocity command based on the detected velocity results in a decay in the velocity command over time.

20. A non-transitory computer readable media including processor executable instructions that when executed by one or more processors perform the method of claim 11.

* * * * *